(12) United States Patent
Jones et al.

(10) Patent No.: US 6,454,632 B1
(45) Date of Patent: Sep. 24, 2002

(54) METHOD OF HARDENING AND POLISHING CONCRETE FLOORS, WALLS, AND THE LIKE

(75) Inventors: Jerald W. Jones, Orem; Perry Maxfield, Altonah, both of UT (US)

(73) Assignee: Curecrete Chemical Company, Inc., Springville, UT (US)

( * ) Notice: Subject to any disclaimer, the term of this patent is extended or adjusted under 35 U.S.C. 154(b) by 0 days.

(21) Appl. No.: 09/690,563

(22) Filed: Oct. 17, 2000

Related U.S. Application Data

(63) Continuation-in-part of application No. 09/183,836, filed on Oct. 30, 1998, now Pat. No. 6,155,907.

(51) Int. Cl.$^7$ ................................................. B24B 1/00
(52) U.S. Cl. ........................... 451/28; 451/41; 451/58; 451/60; 451/353; 404/78; 52/741.15; 264/31
(58) Field of Search ............................ 451/28, 41, 60, 451/58, 36, 37, 353; 404/78; 106/3; 52/741.15, 742; 264/31; 510/240

(56) References Cited

U.S. PATENT DOCUMENTS

| | | | |
|---|---|---|---|
| 165,898 A | | 7/1875 | Watson |
| 1,965,299 A | | 7/1934 | Patterson |
| 2,078,289 A | * | 4/1937 | Sloan ........................ 264/31 |
| 2,196,992 A | | 4/1940 | Keller |
| 2,275,272 A | * | 3/1942 | Scripture .................... 264/31 |
| 2,277,203 A | * | 3/1942 | Boult .......................... 264/31 |
| 3,540,891 A | | 11/1970 | Muhler |
| 3,615,305 A | | 10/1971 | Muhler |
| 3,685,218 A | | 8/1972 | Gambale et al. |
| 4,017,662 A | | 4/1977 | Gehman et al. |
| 4,295,243 A | | 10/1981 | King |
| 4,565,644 A | | 1/1986 | Smith et al. |
| 4,699,807 A | | 10/1987 | Howell |
| 4,748,788 A | * | 6/1988 | Shaw et al. ................... 52/742 |
| 4,910,824 A | | 3/1990 | Nagayama et al. |
| 5,016,310 A | | 5/1991 | Geyer et al. |
| 5,026,421 A | | 6/1991 | Le Loarer et al. |
| 5,057,152 A | | 10/1991 | Marcus et al. |
| 5,174,813 A | | 12/1992 | Cifuentes et al. |
| 5,191,002 A | | 3/1993 | Davis |
| 5,203,046 A | | 4/1993 | Shaw |
| 5,309,592 A | | 5/1994 | Hiratsuka |
| 5,441,677 A | * | 8/1995 | Phillips ....................... 264/31 |
| 5,454,751 A | | 10/1995 | Wiand |
| 5,605,493 A | | 2/1997 | Donatelli et al. |
| 5,723,424 A | * | 3/1998 | Jennings ..................... 510/240 |

FOREIGN PATENT DOCUMENTS

| | | | | |
|---|---|---|---|---|
| JP | 7-53280 | * | 7/1995 | ................. 264/31 |

* cited by examiner

*Primary Examiner*—George Nguyen
(74) *Attorney, Agent, or Firm*—Thorpe North & Western, LLP.

(57) ABSTRACT

A method of both hardening/densifying and polishing a concrete surface includes the steps of first applying to the concrete surface a silicate, siliconate, fluorosilicate, siloxane, silazane, silicon ester, and/or silane hardening/densifying compound, allowing the compound to remain in contact with the surface for a period of time sufficient to allow it to soak into the surface of the concrete, optionally allowing the surface to thoroughly dry, and polishing the surface with water or a diluted silicate, siliconate, fluorosilicate, siloxane, silazane, silicon ester, and/or silane polishing compound. The polishing step includes the steps of applying to the concrete surface water or the diluted polishing compound, mechanically polishing the concrete surface, cleaning the concrete surface, and repeating these steps with polishing pads or discs of increasingly finer grit until the surface obtains the desired level of shine.

36 Claims, No Drawings

METHOD OF HARDENING AND POLISHING CONCRETE FLOORS, WALLS, AND THE LIKE

The present application is a continuation-in-part of U.S. patent application Ser. No. 09/183,836, filed on Oct. 30, 1998 now U.S. Pat No. 6,155,907.

BACKGROUND OF THE INVENTION

1. Field of the Invention

The present invention relates to a method for polishing concrete surfaces. More particularly, the present invention relates to an improved method for polishing and/or repairing concrete walls, floors, and the like using a silicon based compound so that the sheen appearance of the polished concrete remains for a longer period of time than the prior art.

2. State of the Art

Concrete is one of the most widely used construction materials. Because of its strength, durability, ease of manufacture, ease of installation and relatively low cost, it is frequently the material of choice for floors, walls, and the like. However, there are many instances where it is desirable to provide a floor or wall surface that has a pleasing high gloss finish or shine. In such cases, concrete may be overlooked in favor of other more high cost materials such as marble, stone, terrazo, etc.

There are a number of known methods of cleaning and polishing marble and stone surfaces. For example, U.S. Pat. No. 5,605,493 issued to Donatelli et al. discloses a fairly typical method for stone polishing including the steps of applying a solution to a stone floor, mechanically polishing the floor with a rotary disc, and removing the excess slurry. This is accomplished by the use of a self-propelled battery operated stone floor polishing machine having dual rotating heads with detachable stone grinding, honing, and polishing pads. Also included in the machine is an integral solution tank for applying a liquid lubrication to the floor through the heads, a recovery tank for collecting the slurry generated by the grinding, honing, and polishing action and an integral squeegee system that removes the liquid and particle slurry and thereafter transfers the slurry to the recovery tank. The grinding pads are integrated with metallic alloys, bonding industrial diamond abrasives for grinding marble, granite, poured terrazzo, precast terrazzo, cement, concrete, porcelain tile, ceramic tile and teracotta tile.

Similarly, U.S. Pat. No. 4,295,243 issuing to King discloses a similar apparatus. This device is used for cleaning, waxing, polishing and otherwise treating the surface of a floor, including such floors as wood, tile, vinyl, concrete and the like. The use of fluids are only discussed generally and no suggestion is made that a silicon based compound must be used.

Many different compounds have also been tried to polish concrete. For example, in U.S. Pat. No. 4,017,662 issuing to Gehman et al., a water-clear aqueous coating composition containing a hydrophilic copolymer of low molecular weight, a water miscible organic coalescing agent or plasticizer, a polyvalent metal compound, an alkali-soluble resin and a wax are used to apply a transparent coating that increases shine to surfaces including concrete. Though this coating is used to increase shine, no silicon based compound is present.

However, the use of silicon based compounds as abrasives is well known. For example, U.S. Pat. No. 4,565,644 issuing to Smith et al. discloses a floor cleaning and waxing composition which may include silicate abrasives. U.S. Pat. No. 5,191,002 issuing to Davis discloses a floor care maintenance system including a floor finish stripper containing sodium metasilicate. U.S. Pat. No. 1,965,299 issuing to Patterson discloses an abrading and polishing composition for enamels, lacquers, etc., which may include a silicate abrasive agent. U.S. Pat. No. 2,196,992 issuing to Keller discloses a metal polish which contains sodium silicate. U.S. Pat. No. 3,540,891 issuing to Muhler discloses a household cleaning and polishing composition containing zirconium silicate. U.S. Pat. No. 3,615,305 issuing to Muhler discloses a dental amalgam polishing composition containing stannous silicate. U.S. Pat. No. 3,685,218 issuing to Gamble discloses a glass polishing composition containing zirconium silicate. Notably, none of these prior art methods mention or suggest the use of silicates or other silicon based compounds as a polishing and hardening/densifying compound for concrete.

OBJECTS AND SUMMARY OF THE INVENTION

It is therefore an object of the present invention to provide a method of hardening, densifying, and/or polishing a concrete surface using a slurry containing organic or inorganic compounds of silicon, including silicates, siliconates, fluorosilicates, siloxanes, silazanes, halosilanes or combinations thereof.

It is another object of the present invention to provide a method of mechanically polishing a concrete surface to obtain an aesthetically pleasing high gloss using a polishing solution comprised of silicates, siliconates, fluorosilicates, siloxanes, silazanes, halosilanes or combinations thereof.

It is also an object of the present invention to provide a method of internally densifying and/or hardening a concrete surface using silicate, siliconate, fluorosilicate, siloxane, silazane, or silane based compounds.

It is another object of this invention to provide a method of honing, smoothing, and/or polishing a rough concrete surface using silicate, siliconate, fluorosilicate, siloxane, silazane, or silane based compounds.

It is another object of this invention to provide a method of improving the hydrophobic characteristics of a concrete surface using silicate, siliconate, fluorosilicate, siloxane, silazane, or silane based compounds.

It is yet another object of the present invention to provide a method that enables the user to determine the desired level of shine to be applied to the concrete and accomplish that level of shine.

These and other objects are realized in a specific illustrative embodiment of a method of hardening and polishing concrete surfaces. This method includes the steps of densifying and hardening the concrete surface by applying a silicate, siliconate, fluorosilicate, siloxane, silazane, silicon ester, and/or silane based hardening/densifying compound, allowing the hardening/densifying compound to remain in contact with the concrete surface for a period of time sufficient to allow the surface of the concrete to undergo hardening/densifying, and polishing the surface with a diluted polishing compound comprising water or diluted silicate, siliconate, fluorosilicate, siloxane, silazane, and/or silane. The surface polishing step includes applying to a concrete surface a diluted polishing compound comprising water or diluted silicate, siliconate, fluorosilicate, siloxane, silazane, silicon ester, and/or silane, mechanically or otherwise polishing the concrete surface with a drum, disc or pad, e.g., a rotary drum or disc polishing machine may be utilized, cleaning the concrete surface and then repeating the above steps with polishing discs, drums or pads of increasingly finer grit until the surface obtains an aesthetically desirable level of shine.

In accordance with another aspect of the invention, a rough concrete surface may be honed and polished by the steps of cleaning the surface, honing the surface with a rough grit honing disc so as to produce a smooth even surface, using water or other another aqueous liquid as a lubricant, applying to the concrete surface a silicate, siliconate, fluorosilicate, siloxane, silazane, silicon ester and/or silane based hardening/densifying compound, allowing the hardening/densifying compound to remain in contact with the surface for a period of time sufficient to allow the compound to harden/densify the concrete surface, and polishing the surface with a diluted polishing compound as described above. Additional optional steps may be followed, including cleaning the concrete when appropriate, removing excess hardening/densifying compound and/or allowing the hardening/densifying compound in contact with the concrete surface to dry.

Other objects and features of the invention will be apparent to those skilled in the art, based on the following description.

DETAILED DESCRIPTION OF THE PREFERRED EMBODIMENT

A concrete surface, such as a floor or wall, may be polished in accordance with the present invention once it has cured sufficiently. Adequate curing usually requires at least 28 days after the concrete is placed, though the time may vary depending on environmental conditions, the particular concrete mix, and whether any additives such as fast-setting admixture have been used in the concrete. Naturally, concrete surfaces that have been in place for long periods of time may also be hardened and polished in accordance with the principles of the present invention.

Concrete is a mixture of portland cement, aggregate of varying sizes (e.g. sand, gravel, and small stones), water, and air. It is initially a plastic mixture, which can be cast or molded, but over a relatively short period of time (from a few hours to several days) becomes a solid mass through chemical reaction. Aggregates used in concrete may vary in chemical composition, but typically include substantial proportions of silicon compounds, usually in the form of silica and silicates. More importantly, portland cement is primarily composed of silicates, in the form of tricalcium silicate and dicalcium silicate. Consequently, the presence of these compounds in the cement and aggregate provide a multitude of silicon—oxygen—hydrogen (Si—O—H) species on the surface of cured concrete.

The presence of these chemical species allow the surface of concrete to be modified using silicon compounds. Silicate materials, such as concrete, owe their strength and hardness characteristics in part to two important properties: (1) the Si—O—Si bond system, and (2) the 3-dimensional structure of this bond system. In the 3-dimensional bond system, four oxygen atoms bonded to one silicon atom link with other silicon atoms in 3-dimensions, forming a continuing structure filling a 3-dimensional space. (By comparison, 2-dimensional bonding produces sheet-like structures, and 1-dimensional bonding produces simple chains.) Not surprisingly, 2-dimensional and 1-dimensional bonding systems are much weaker than 3-dimensional bonding systems.

Where there are open oxygen bonding sites on the surface of concrete, the concrete surface can be strengthened by providing additional chemically reactive quantities of silicon species to react with these bonding sites, to produce more Si—O—Si structures. For example, the Si—O species that are provided via a soluble inorganic silicate may displace the hydrogen in Si—OH species which are present in the concrete surface, such as the surface of a microscopic crack or void. The silicon bonds with the oxygen, and the hydrogen is liberated along with other hydrogen and oxygen atoms in the form of water, according to the following reaction:

Si—O—H(conc. surface)+H—O—Si(silicon compound)→Si—O—Si+H$_2$O

The newly attached Si—O species links with other Si—O species, forming a 3-dimensional system which bridges the crack or void, connecting to Si—O species which are attached to other parts of the surface of the crack or void, in the same manner. In this manner, the crack or void is filled in with an extensive 3-dimensional crystaline structure of tightly linked silicate species, which bridges and fills in cracks, gaps, voids, etc. in the concrete surface, imparting improved strength, surface hardness, and hydrophobic characteristics to the concrete surface. Subsequent polishing and abrading processes will consequently remove smaller pieces of the surface, resulting in a better shine and appearance. These improvements are possible through the proper application of silicon containing compounds to the concrete surface as either or both a densifying/hardening agent, and as a polishing agent.

There are several classes of silicon containing compounds that can be used to improve the characteristics of concrete surfaces in this way. The most useful of these are silicates, siliconates, and fluorosilicates, with silicates being most preferred. However, siloxane, silazane, and silane compounds are also useful, and any silicon compound which will react with open bonding sites on a concrete surface may be used in accordance with the principles of the present invention. Compounds such as siloxanes and silazanes give reactions similar to the silicates with the elimination of alkoxide or amide groups. The following discussion will consider the relevant aspects of each of the above specifically mentioned compounds.

1. Soluble Inorganic Silicates

These materials react with existing silicate materials in the concrete surface to improve the strength, surface hardness, and hydrophobic characteristics to the concrete surface. A general chemical formula for soluble inorganic silicates is:

$$M_xSi_yO_z$$

where M is an alkali metal such as lithium, sodium, potassium, rubidium, or cesium, or mixtures thereof; x is an integer, such as 1, 2, 4, 6, 8, 10, etc.; y is an integer such as 1, 2, 5, 11, 14, etc.; and z is an integer such as 1, 3, 6, 10, 12, 15, 20, etc. It will be apparent to one skilled in the art that x, y, and z are numbers which reflect the valency of the elements in the chemical species. Specific examples of soluble inorganic silicates which are suitable for use in accordance with the present invention include: Na$_4$Si$_{17}$O$_{16}$, K$_4$Si$_{15}$O$_{12}$, Na$_4$SiO$_4$, KHSi$_2$O$_5$, Na$_6$Si$_2$O$_7$, and K$_2$Si$_2$O$_5$.

These silicates may be used as pure compounds, but, more typically, are dissolved in solvents such as water or alcohol, and are applied as mixtures of the solvent, and one or more of the above species in solution. Surfactants may also be added as needed, along with other components such as catalysts, colorings, pigments, or dyes, and scent agents if desired. This is also true of the other chemical species discussed below—for reasons of cost and practicality, they are preferably used in a solution, mixture, or mixture of solutions containing the described species or species type, and other species and mixture components.

2. Siliconates

Siliconates also interact with existing silicate materials in the concrete surface to improve the strength, surface hardness, and hydrophobic characteristics of the surface as with the soluble inorganic silicates discusses above. Siliconates are silicates with an organic group added. A representative formula may be:

$$(RSiO_x)_y M_z$$

where R is an organic group, typically a small alkyl group comprising 1 to 10 carbon atoms, branched or unbranched, or an aryl group comprising a ring of 6 carbon atoms, such as methyl ($CH_3$), ethyl ($C_2H_5$), decyl ($C_{10}H_{21}$), or phenyl ($C_6H_5$); x is a small integer, normally 1 or 3; y is a small integer, normally from 1 to 10, though it could be larger; z is an integer, normally from 1 to 4; and M is an alkali metal, such as those mentioned above. Alternatively, M may also include other species, such as magnesium, zinc, or tin. Specific examples of siliconates which are suitable for use in accordance with the present invention include: $CH_3SiO_3K_3$, $C_4H_9SiO_3Na_3$, dimer $(CH_3SiO_2)ONa_4$ (a polymer form), and polymer $CH_3SiO_2Na$ (extended polymeric form).

3. Fluorosilicates

Like silicates and siliconates, fluorosilicates also interact with silicate materials in the concrete surface to improve Si—O bonding, and improve the strength, surface hardness, and hydrophobic characteristics of the concrete, as discussed above. A general formula for fluorosilicates is:

$$M_x(SiF_y)_z$$

where M is an alkali metal such as lithium, sodium, potasium, rubidium, or cesium, or an alkaline earth metal, such as magnesium, or another metal such as manganese, zinc, or tin; x is an integer such as 1 or 2; y is an integer such as 6; and z is a small integer such as 1 or 2. Specific examples of fluorosilicates which are suitable for use in accordance with the present invention include: $Na_2SiF_6$, $MgSiF_6$, $ZnSiF_6$, and $Sn(SiF_6)_2$.

4. Silicon Esters

Silicon esters are silicon compounds with carboxylic acids bonded to the silicon atom. Silicon esters are relatively insoluble in water, but can be used as dispersions in water for treatment of concrete in accordance with the principles of the present invention. A general formula for a silicon ester is:

$$R_xSi(CO_2R')_y$$

where R is an organic group, typically a small alkyl group comprising 1 to 10 carbon atoms, branched or unbranched, or an aryl group comprising a ring of 6 carbon atoms, such as $CH_3$ (methyl), $C_4H_9$ (butyl), or $C_8H_{17}$ (octyl); and x and y are small integers selected such that x+y=4. R' is another organic group which could be the same as R, or it could be a different organic group, frequently having 8 to 10 carbon atoms. Examples of silicon esters which may be used in accordance with the present invention include $CH_3Si(COO—CH_3)_3$ (methyltriacetoxysilane) and $(C_4H_9)_2Si(COO—CH_3)_2$ (dibutyldiacetoxysilane).

5. Siloxanes

Siloxanes are silicon alkoxides (though they are sometimes mistakenly referred to as silicon esters), are relatively insoluble in water, and hydrolize to $SiO_2$ and/or other products quite easily. However, siloxanes can be used as dispersions in water for treatment of concrete in accordance with the principles of the present invention. Two general formulas for siloxanes which may be used in accordance with the present invention are:

$$R—Si(OR')_3 \text{ and } Si(OR')_4$$

where R is an organic group, typically a small alkyl group comprising 1 to 10 carbon atoms, branched or unbranched, or an aryl group comprising a ring of 6 carbon atoms, such as $CH_3$, $C_6H_5$, or $C_8H_{17}$; and R' is a second organic group which like R is a small alkyl group or aryl group, and could be the same as or different than R, such as $C_2H_5$, or $(CH_3)_2CH$. Alternatively, the R group could comprise a functional group such as amine, alcohol, mercaptan, etc. One example would be $H_2N—CH_2CH_2—Si(OCH_3)_3$. Polymers of these compounds may also be used as the hardening/densifying agent. Catalysts such as metal-organic compounds of zirconium (Zr), cerium (Ce), niobium (Nb), and titanium (Ti), such as $Ti(OR')_4$ may also be added to the hardening densifying compound to improve the reactions with concrete.

It is believed that siloxanes do not have as much effect on hardening and densifying the concrete surface as some of the other species mentioned above, such as silicates and siliconates. However, these substances still help impart hydrophobic properties to the surface, and may thus be used in accordance with the principles of the present invention.

6. Silazanes

Silazanes are compounds with silicon bonded to basic nitrogen. Like the siloxanes, silazanes are also relatively insoluble in water, and if used are preferably used as dispersions in water. A general formula would be:

$$R_xSi(NR'_y)_z$$

where R is an organic group, typically a small alkyl group comprising 1 to 10 carbon atoms, branched or unbranched, or an aryl group comprising a ring of 6 carbon atoms; R' is a second organic group which, like R, is a small alkyl group or aryl group, and could be the same as or different than R; x is an integer such as 1, 2, 3, etc.; y is an integer such as 1, 2, etc.; and z is an integer chosen such that x+z=4. Dimers, trimers, and polymers of these silazanes may also be used. A specific example of a silazane useful in accordance with the principles of the present invention is $[(CH_3)_2—Si]_2(NCH_3)$.

Like the siloxanes, it is believed that silazanes do not have as much effect on hardening and densifying the concrete surface as silicates, siliconates, and fluorosilicates. However, these substances still help impart hydrophobic properties to the surface, and may thus be used in accordance with the principles of the present invention.

7. Halosilanes

Halosilanes comprise silanes bonded to a halogen, A general formula for a halosilane suitable for use according to the present invention would be:

$$R_xSiX_y$$

where R is an organic group, typically a small alkyl group comprising 1 to 10 carbon atoms, branched or unbranched, or an aryl group comprising a ring of 6 carbon atoms; X is a halogen, such as chlorine, bromine, iodine, etc.; and x and y are small integers, such as 1, 2, 3, etc., selected such that x+y=4.

Halosilanes react effectively with Si and O species in the presence of bases such as amines, sodas, etc., and thus help improve the properties of the concrete. One skilled in the art will also recognize that when mixed, solutions of halosilanes quickly form siloxanes through reaction with the components of the solution, as discussed in the examples below. Operative examples of halosilanes which are useful in accordance with the principles of the present invention are $(C_6H_5)_2SiCl_2$, and $(C_8H_{17})SiBr_3$. Reactive organic groups may also be used with silanes to improve their reaction with the concrete. As used herein, the terms silane and halosilane are both used to refer to halosilanes.

Like the siloxanes and silazanes, it is believed that the halosilanes do not have as much effect on hardening and densifying the concrete surface as silicates, siliconates, and fluorosilicates. However, these substances still help impart hydrophobic properties to the surface, and may thus be used in accordance with the principles of the present invention. It should also be recognized that some types of halosilanes form acidic species which can damage concrete, and must be accounted for, such as by the addition of acid neutralizing compounds. For example, butyltrichlorosilane tends to form acidic chlorides which can cause pitting in the concrete surface. However, the addition of a suitable amount of triethylamine is effective to reduce the acidity of the hardening/densifying compound.

The general process of polishing/hardening a concrete surface in accordance with the principles of the present invention involves first applying to the concrete a silicate, siliconate, fluorosilicate, siloxane, silazane, silane, and/or silicon ester based hardening/densifying compound. This compound, in solution, is applied to the concrete surface at a suitable rate to substantially wet the surface, and is allowed to remain in contact with the surface for a period of time sufficient to allow the compound to fully soak into the surface of the concrete so that the concrete may be hardened/densified. A diluted polishing compound is then applied to the surface to form a polishing slurry as the surface is buffed or polished using for example, a rotary polishing machine. The diluted polishing compound may comprise water alone, or it may comprise a diluted version of a hardening/densifying compound, that is, a solution of silicate, siliconate, fluorosilicate, siloxane, silazane, silicon ester, and/or silane compounds. The diluted polishing compound may be applied prior to polishing, or contemporaneously with the polishing step.

In the hardening/densifying compound, the water or alcohol to silicate, siliconate, fluorosilicate, siloxane, silazane, silicon ester, and/or silane should be a ratio of from about 20:1 to 1:1 by volume. However, a preferred ratio is about 3:1 or 5:1. In the diluted polishing compound, where water alone is not used, the water or alcohol to silicate, siliconate, fluorosilicate, siloxane, silazane, silicon ester, and/or silane should be a ratio of from about 30:1 to 1:1. However, the preferred ratio should be about 10:1.

Suitable rotary polishing machines are well known in the industry, and typically incorporate circular abrasive pads, discs or drums, which mount to the bottom of the machine. Suitable pads or discs are widely commercially available from sources known to those skilled in the art, and may comprise diamond-impregnated abrasive discs or drums. However, other methods of polishing are also contemplated by the present invention.

To adequately polish the surface following this method, it is required to pass over the surface with the rotary polishing machine so as to allow the rotating disc, pad or drum having a grit from about 20 to 3000 to contact all areas of the surface at least once. However, two or three passes in alternatingly perpendicular directions may be used to obtain superior results. During polishing there should be a continuous flow of polishing compound to adequately lubricate the polishing action and impart desired shine to the surface. When the appropriate passes have been made over a given surface, the surface is cleaned and inspected to determine whether the desired level of shine has been achieved. The surface must be dry in order to determine whether the desired shine has been achieved.

If the desired level of shine has not been achieved, the above process is repeated using abrasive pads of less coarse grit each time, and cleaning the surface between each repetition of the process. If the floor is not cleaned between each repetition of the process, excessive wear of the polishing disc will occur. As is well known in the industry, the coarseness of abrasives is indicated by numbers, with lower numbers representing coarser grit, and higher numbers representing finer grit. A typical concrete surface in good condition may be initially polished with 120 to 800 grit pads, discs or drums, depending on the desired sheen. With each successive repetition of the polishing process, the grit number of the desired pad will typically increase by 200 each time. A satisfactorily high gloss may be obtained with pads, discs or drums of anywhere from 800 to 2200 grit, depending on the preferred level of shine.

Alternatively, when polishing a rough or damaged concrete surface, the surface may need to be honed before the polishing process is possible. The surface may first be cleaned, then honed, preferably with a 30, 50, or 120 grit rotary grinding disc making at least one pass. Preferably, water is used as a lubricant to produce a slurry. This process may require more passes or graduation from one grit level to another—with cleaning in between—as described above. Once the surface has become smooth and even, a silicate, siliconate, fluorosilicate, siloxane, silicon ester, and/or silane hardening/densifying compound (described earlier) is applied to the surface and allowed to soak into it. This compound will preferably be applied at a rate of one gallon per 30 to 600 square feet, depending primarily upon the porosity of the concrete, and will be allowed to soak into the surface for approximately 30 to 60 minutes without removing the excess. The surface may optionally be allowed to thoroughly dry before polishing begins. The surface is then polished as described above, preferably starting with a 30 or 50 grit pad, disc or drum then stepping up to 220 or 600 grit, and so on until the desired shine is achieved, using a continuous flow of diluted polishing compound comprising water or water with silicate, siliconate, fluorosilicate, siloxane, silazane, silicon ester, and/or silane polishing compound (preferably diluted 10:1 with water as described above) with each grit, and always removing the slurry between polishing stages.

Finally, a porous, soft, or carbonated, concrete surface may be polished using this method. However, such a surface may need to be honed before polishing is possible. In such case, the surface should first be cleaned, then honed with a 30, 50, or 120 grit rotary grinding disc. Water or another lubricant is used to produce a slurry. This process may require more passes and/or graduation from one grit level to another, with cleaning in between, as described above. Once the soft surface has been removed and the remaining surface has become smooth and even, a silicate, siliconate, fluorosilicate, siloxane, silazane, silicon ester, and/or silane hardening/densifying compound (described above) is applied to the surface and allowed to soak into it. This compound is preferably applied at a rate of one gallon per 30 to 600 square feet, depending upon the porosity of the concrete, and is allowed to soak into the surface for approximately 30 to 60 minutes without removing the excess, though puddles may optionally be removed. The surface is optionally allowed to dry completely before polishing begins. The surface is then polished as described above starting with preferably a 30 or 50 grit pad, disc or drum, and stepping up to preferably a finer grit pad, disc or drum such as a 440 or 600 grit, and so on until the desired shine is achieved, using a continuous flow of diluted polishing compound comprising water or water and silicate, siliconate, fluorosilicate, siloxane, silazane, silicon ester, and/or silane polishing compound (preferably diluted 10:1 with water as described above) with each grit, and always removing the slurry between polishing stages.

Thus, in the manner described, a concrete surface may be hardened and polished to a high gloss finish or shine.

EXAMPLES

The following illustrative examples present the method of use of a selection of the above described compounds used according to the present invention in a variety of conditions and with concrete presenting a variety of defects. These examples are only illustrative, and are not intended to be limiting. The invention is not limited to the particular compounds listed, nor are the types of compounds presented limited to use in the specific situations with which they are here presented.

Example 1
Soft Concrete—Silicon Ester

After the soft concrete was removed and the surface was smoothed using a rotary polishing machine with an abrasive polishing disk, a hardening/densifying compound comprised of approximately 75% water, and 25% dibutyldiacetoxysilane, by volume, with a small amount of surfactant (approx. 1%) added as a dispersant, was applied to a 2000 square foot concrete floor at a rate of 50–100 square feet per gallon. The hardening/densifying compound was allowed to soak into the concrete for 30 minutes. The hardening/densifying compound penetrated the surface of the concrete such that it did not have to be removed. A second application of the hardening/densifying compound was made at a rate of 600–1000 square feet per gallon. This second application was allowed to dry for 24–48 hours. Subsequently, water was applied to the concrete at a rate of about 400 square feet per gallon. While the concrete was still damp, a rotary polishing machine was used to polish the concrete. This polishing step was then repeated by using higher grit polishing discs on each occasion. The result was a hardened concrete substrate having a very high sheen finish.

Example 2
Soft Concrete—Silicon Ester

A hardening/densifying compound comprised of 5 parts alcohol (isopropyl, methyl, or ethyl) and 1 part ethyltriacetoxysilane, by volume, was applied to a 2000-square foot concrete floor at a rate of 100–200 square feet per gallon. The hardening/densifying compound was allowed to soak into the concrete floor for 30 minutes. The hardening/densifying compound penetrated the surface such that it did not have to be removed. A second application of the hardening/densifying compound was applied at a rate of 600–1000 square feet per gallon. This second application was allowed to dry for 24–48 hours. Subsequently, water was applied to the concrete at a rate of about 400 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 3
Rain Damaged Concrete—Silane

After the concrete damage was removed and the surface was smoothed using a rotary polishing machine with an abrasive polishing disk, a hardening/densifying compound comprised of 1 part octyltrichlorosilane in 5 parts alcohol was applied to a 2000-square foot concrete floor at a rate of 200 square feet per gallon. The hardening/densifying compound was allowed to soak into the concrete floor for 30 minutes. Any puddles were removed and allowed to dry. A second application of the hardening/densifying compound was applied at a rate of 600–1000 square feet per gallon and allowed to dry for 24 hours. Subsequently, water with 5% sodium carbonate was applied to the concrete at a rate of about 400 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 4
Rain Damaged Concrete—Silane

After the concrete damage was removed and the surface was smoothed using a rotary polishing machine with an abrasive polishing disk, a hardening/densifying compound comprised of 20% butyltrichlorosilane in a solution of 70% methylalcohol and 10% triethylamine (for neutralizing the acid in the solution), by volume, was applied to a 2000-square foot concrete floor at a rate of 200–300 square feet per gallon. As noted above, when mixed, solutions of halosilanes quickly form siloxanes through reaction with the components of the solution. In the present example, the named constituents will produce butyltriethoxysilane.

The hardening/densifying compound was allowed to soak into the concrete floor for 30 minutes. Any puddles were removed and allowed to dry. Subsequently, water with 5% sodium carbonate by weight was applied to the concrete at a rate of about 400 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 5
Concrete With a Poor Finish—Silazane

After the floor was smoothed using a rotary polishing machine with an abrasive polishing disk to remove the poor finish, a hardening/densifying compound comprised of 10 parts alcohol and 1 part hexamethyldisilazane, by volume, was applied to a 2000-square foot concrete floor at a rate of 200 square feet per gallon. The hardening/densifying compound was allowed to soak into the concrete for 30 minutes. Any puddles were removed and allowed to dry. A second application of the hardening/densifying compound was applied at a rate of 600–1000 square feet per gallon and allowed to dry for 24 hours. Subsequently, water was applied to the concrete at a rate of about 400 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 6
Concrete With a Poor Finish—Silazane

After the floor was smoothed using a rotary polishing machine with an abrasive polishing disk to remove the poor finish, a hardening/densifying compound comprised of 10 parts alcohol and 1 part hexabutyldisilazane, by volume, was applied to a 2000-square foot concrete floor at a rate of 300 square feet per gallon. The hardening/densifying compound was allowed to soak into the concrete for 30–45 minutes. Any puddles were removed and allowed to dry. Subsequently, water was applied to the concrete at a rate of about 300 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 7
Concrete Needing Additional Shine—Silane

A hardening/densifying compound comprised of 1 part butyltriethoxysilane and 9 parts alcohol, by volume, was applied to a 2000-square foot concrete floor at a rate of 200 square feet per gallon. The hardening/densifying compound was allowed to soak into the concrete for 30 minutes. Any puddles were removed and allowed to dry. A second application of the hardening/densifying compound was applied at a rate of 600–1000 square feet per gallon and allowed to dry for 24–48 hours. Subsequently, water was applied to the concrete at a rate of about 400 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 8
Concrete Needing Additional Shine—Silane

A hardening/densifying compound comprised of 20 parts alcohol and 1 part octyltrimethoxysilane, by volume, was applied to a 2000-square foot concrete floor at a rate of 300 square feet per gallon. The hardening/densifying compound was allowed to soak into the concrete for 45 minutes. Any puddles were removed and allowed to dry for 12–48 hours. Subsequently, water was applied to the concrete at a rate of about 300 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 9
Porous Concrete—Fluorosilicate

A hardening/densifying compound comprised of 1 part zinc fluorosilicate in 10 parts water, by weight, was applied to a 2000-square foot concrete floor at a rate of 100–200 square feet per gallon. The hardening/densifying compound was allowed to soak into the concrete for 45 minutes. Any puddles were removed and allowed to dry. A second application of the hardening/densifying compound was applied at a rate of 600–1000 square feet per gallon and allowed to dry for 24–48 hours. Subsequently, water was applied to the concrete at a rate of about 400 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 10
Porous Concrete—Fluorosilicate

A hardening/densifying compound comprised of 1 part magnesium fluorosilicate in 10 parts water, by weight, was applied to a 2000-square foot concrete floor at a rate of 100–200 square feet per gallon. The hardening/densifying compound was allowed to soak into the concrete for 45 minutes. Any puddles were removed and allowed to dry. Subsequently, water was applied to the concrete at a rate of about 300 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 11
Dusting Concrete—Silicate

A hardening/densifying compound comprised of 5 parts water and 1 part sodium silicate concentrate, by volume, was applied to a 2000-square foot concrete floor at a rate of 200 square feet per gallon. The hardening/densifying compound was allowed to soak into the concrete for 30 minutes. Any puddles were removed and allowed to dry completely. A second application of the hardening/densifying compound was applied at a rate of 600–1000 square feet per gallon and allowed to dry for 24–48 hours. Subsequently, water was applied to the concrete at a rate of about 400 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 12
Dusting Concrete—Siliconate

A hardening/densifying compound comprised of 5 parts water and 1 part sodium methyl-siliconate, by volume, was applied to a 2000-square foot concrete floor at a rate of 300 square feet per gallon. The hardening/densifying compound was allowed to soak into the concrete for 45 minutes. Any puddles were removed and allowed to dry for 24 hours. Subsequently, water was applied to the concrete at a rate of about 400 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 13
Carbonated Concrete—Silicate

After the carbonation was removed and the surface was smoothed using a rotary polishing machine with an abrasive polishing disk, a hardening/densifying compound comprised of 1 part sodium silicate and 5 parts water, by volume, was applied to a 2000-square foot concrete floor at a rate of 50–100 square feet per gallon. The hardening/densifying compound was allowed to soak into the concrete for 30 minutes. The hardening/densifying compound completely penetrated and did not have to be removed. A second application of the hardening/densifying compound was applied at a rate of 600–1000 square feet per gallon and allowed to dry for 24–48 hours. Subsequently, water was applied to the concrete at a rate of about 400 square feet per gallon. While the concrete was still damp, a rotary polishing machine was used to polish the concrete. This polishing step was then repeated by using higher grit polishing discs on each occasion. The result was a hardened concrete surface having a very high sheen finish.

Example 14
Carbonated Concrete—Siliconate

After the carbonation was removed and the surface was smoothed using a rotary polishing machine with an abrasive polishing disk, a hardening/densifying compound comprised of 10 parts water and 1 part sodium octylsiliconate, by weight, was applied to a 2000-square foot concrete floor at a rate of 100–200 square feet per gallon. The hardening/densifying compound was allowed to soak into the concrete for 30 minutes. The hardening/densifying compound completely penetrated and did not have to be removed. A second application of the hardening/densifying compound was applied at a rate of 600–1000 square feet per gallon and allowed to dry for 24–48 hours. Subsequently, water was applied to the concrete at a rate of about 400 square feet per gallon. While the concrete was still damp, a rotary polishing machine was used to polish the concrete. This polishing step was then repeated by using higher grit polishing discs on each occasion. The result was a hardened concrete surface having a very high sheen finish.

It is to be understood that the above-described arrangements and examples are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A method of hardening/densifying and polishing a cured concrete surface, comprising the sequential steps of:
   (a) applying to the concrete surface a hardening/densifying compound comprising a member selected from the group consisting of silicates, siliconates, fluorosilicates, siloxanes, silazanes, silanes, silicon esters;
   (b) allowing the hardening/densifying compound to remain in contact with the concrete surface for a period of time sufficient to allow the compound to harden/densify the concrete surface;
   (c) applying to the concrete surface a diluted polishing compound; and
   (d) polishing the concrete surface.

2. The method as described in claim 1, wherein the hardening/densifying compound is comprised of a member selected from the group consisting of silicates, siliconates, fluorosilicates, siloxanes, silazanes, silanes, silicon esters, and combinations and solutions thereof in solvents comprising a member selected from the group consisting of water and alcohol.

3. The method as described in claim 2, wherein the hardening/densifying compound is applied at a rate of about one gallon per 30 to 600 square feet of the concrete surface.

4. The method as described in claim 3, wherein the step of allowing the hardening/densifying compound to remain in contact with the surface further comprises the step of removing any excess of the hardening/densifying compound from the concrete surface.

5. The method as described in claim 4, wherein the excess of the hardening/densifying compound is removed from contact with the concrete surface from 30 to 60 minutes after applied.

6. The method as described in claim 2, wherein the step of allowing the hardening/densifying compound to remain in contact with the surface further comprises the step of allowing the compound in contact with the concrete surface to dry.

7. The method as described in claim 2, wherein the hardening/densifying compound comprises water and a compound selected from the group consisting of silicates, siliconates, fluorosilicates, siloxanes, silazanes, silanes, silicon esters, and combinations thereof at a ratio from about 8:1 to 1:1 by volume.

8. The method as described in claim 7, wherein the ratio is about 3 to 1 by volume.

9. The method as described in claim 1, wherein the diluted polishing compound is selected from the group consisting of water, and solutions of silicates, siliconates, fluorosilicates, siloxanes, silazanes, silanes, silicon esters, and combinations thereof, in a solvent comprising a member selected from the group consisting of water and alcohol.

10. The method as described in claim 9, wherein the diluted polishing compound is applied at a rate of one gallon per 50 to 6000 square feet.

11. The method as described in claim 10, wherein the diluted silicate polishing compound comprises water and a compound selected from the group consisting of silicates, siliconates, fluorosilicates, siloxanes, silazanes, silanes, silicon esters, and combinations thereof at a ratio from about 30:1 to 1:1 by volume.

12. The method as described in claim 11, wherein the ratio is about 10 to 1 by volume.

13. The method as described in claim 1, wherein the surface is polished mechanically by a polishing disc, drum or pad having a grit coarseness range from about 30 to 3000.

14. The method as described in claim 1, wherein steps (c) and (d) are conducted simultaneously.

15. The method as described in claim 2, wherein the hardening/densifying compound is comprised of a silicate or mixture of silicates.

16. The method as described in claim 15, wherein the hardening/densifying compound is sodium silicate.

17. The method as described in claim 2, wherein the hardening/densifying compound is comprised of a fluorsilicate or mixture of fluorsilicates.

18. The method as described in claim 17, wherein the hardening/densifying compound is a fluorosilicate selected from the group consisting of zinc fluorosilicate, magnesium fluorosilicate and mixtures thereof.

19. The method as described in claim 2, wherein the compound is comprised of a siliconate or mixture of siliconates.

20. The method as described in claim 19, wherein the compound is sodium methyl siliconate.

21. A method of polishing a cured concrete surface, comprising the steps of:
   (a) applying to the concrete surface a diluted polishing compound selected from the group consisting of water and silicates, siliconates, fluorosilicates, siloxanes, silazanes, silanes, silicon esters, and combinations and solutions thereof in solvents comprising a member selected from the group consisting of water and alcohol; and (b) polishing the concrete surface to which the compound has been applied.

22. The method as described in claim 21, wherein the diluted polishing compound is comprised of water and a compound selected from the group consisting of silicates, siliconates, fluorosilicates, siloxanes, silanes, silicon esters, and combinations thereof.

23. The method as described claim 22, wherein the diluted polishing compound is applied at a rate of one gallon per 50 to 6000 square feet of concrete surface.

24. The method as described in claim 23, wherein the ratio of water to the compound is from 30:1 to 1:1 by volume.

25. The method as described in claim 24, wherein the ratio is about 10 to 1 by volume.

26. The method as described in claim 21, wherein the surface is polished by a member selected from the group consisting of polishing discs, drums and pads.

27. The method as described in claim 26, wherein the polishing pads, discs, or drums are in a grit coarseness range of about 20 to 3000.

28. The method as described in claim 27, further comprising the steps of:
   (c) cleaning the concrete surface;
   (d) applying to the concrete surface more of the diluted polishing compound; and
   (e) polishing the concrete surface with a polishing pad, disc, or drum having a finer grit than was used in previous polishing step.

29. The method as described in claim 28, wherein steps (c) through (e) are repeated until the surface has a desired level of shine.

30. A method of honing and polishing a rough, irregular, cured concrete surface, comprising the steps of:
   (a) honing the surface with a rough grit honing pad, disc or drum and a lubricant to produce a substantially smooth, even surface;
   (b) applying to the concrete surface a hardening/densifying compound selected from the group consisting of silicates, siliconates, fluorosilicates, siloxanes, silazanes, silanes, silicon esters, and combinations and solutions thereof in solvents comprising a member selected from the group consisting of water and alcohol;
   (c) allowing the hardening/densifying compound to remain in contact with the surface for a period of time sufficient to harden/densify the surface of the concrete;
   (d) polishing the concrete surface.

31. The method described in claim 30, wherein the surface is polished by a polishing disc, drum or pad having a grit coarseness range from about 20 to 3000.

32. The method as described in claim 30, wherein the lubricant is water.

33. The method described in claim 30, further comprising the steps of:
   (e) cleaning the concrete surface;
   (f) applying to the concrete surface a diluted polishing compound;
   (g) polishing the concrete surface with a polishing pad, disc or drum having a finer grit than was used in previous polishing step; and
   (h) repeating steps (e) through (g) until, upon cleaning, the surface has a desired level of shine.

34. The method as described in claim 30, further comprising the preliminary step of cleaning the concrete and allowing the concrete surface to dry prior to the step of applying the hardening/densifying compound to the concrete surface.

35. The method as described in claim 30, further comprising removing an existing coating before honing and polishing the surface, the method comprising the preliminary steps of:
   (i) abrading the surface with a coarse rotating grinder disc;
   (ii) applying a chemical stripper to remove any remaining part of the coating; and
   (iii) cleaning the concrete surface.

36. A method of removing and leveling soft, porous, carbonated concrete from a cured concrete surface and polishing the surface, the method comprising the steps of:
   (a) abrading and removing the soft surface with a coarse rotating grinder;
   (b) cleaning the surface and allowing it to dry;
   (c) applying to the concrete surface a hardening/densifying compound selected from the group consisting of silicates, siliconates, fluorosilicates, siloxanes, silazanes, silanes, silicon esters, and combinations and solutions thereof in solvents comprising a member selected from the group consisting of water and alcohol;
   (d) allowing the hardening/densifying compound to remain in contact with the surface for a period of time sufficient to harden/densify the surface of the concrete;
   (e) polishing the concrete surface with a polishing pad, disc or drum having a grit coarseness from about 20 to 3000.
   (f) cleaning the concrete surface;
   (g) applying to the concrete surface a diluted polishing compound selected from the group consisting of water and silicates, siliconates, fluorosilicates, siloxanes, silazanes, silanes, silicon esters, and combinations and solutions thereof in solvents comprising a member selected from the group consisting of water and alcohol;
   (h) polishing the concrete surface with a polishing pad, disc or drum having a less rough grit than was used in previous polishing step; and
   (i) repeating steps (f) through (h) until, upon cleaning, the surface has a desired level of shine.

* * * * *